Nov. 20, 1934.  W. G. BURHANS  1,981,307

FILTER CARTRIDGE

Filed Oct. 6, 1933

Inventor

W. G. Burhans

By Clarence A. O'Brien
Attorney

Patented Nov. 20, 1934

1,981,307

UNITED STATES PATENT OFFICE 1,981,307

FILTER CARTRIDGE

William Gordon Burhans, Kingston, N. Y.

Application October 6, 1933, Serial No. 692,529

3 Claims. (Cl. 210—131)

The present invention relates to new and useful improvements in cartridges for use particularly in oil filters of the general type covered by my U. S. Patents 1,632,461 and 1,910,747, and has for its primary object to provide, in a manner as hereinafter set forth, a cartridge of this character embodying novel means for preventing compressing or collapsing of the filtering material.

Other objects of the invention are to provide a filter cartridge of the character described which will be simple in construction, strong, durable, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
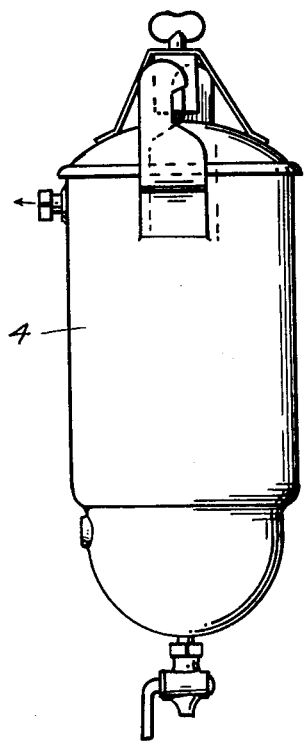
Figure 1 is a side elevational view, showing a complete oil filter.
Figure 2:
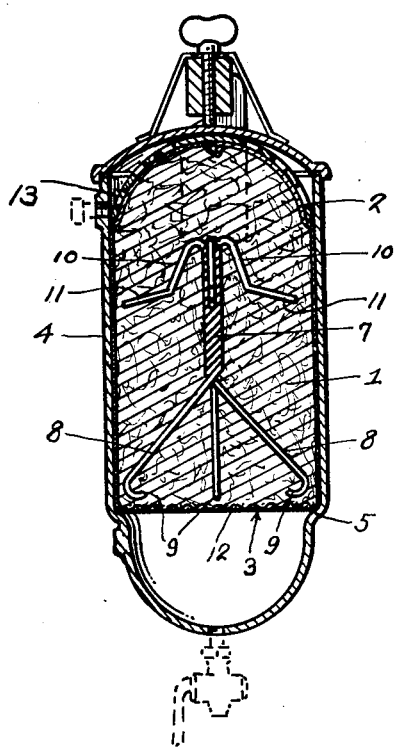
Figure 2 is a view in vertical section through the complete filter, showing the cartridge constituting the present invention incorporated therein.

Referring now to the drawing in detail, it will be seen that the embodiment of the invention which has been illustrated comprises a body of suitable filtering material 1 which is preferably waste. The body 1 is enclosed in a suitable fabric covering or container 2 which, if desired, may be substantially in the form of a bag. It will thus be seen that a cartridge designated generally by the reference numeral 3 is provided which is adapted to be placed in a container 4 having its lower portion formed to provide a supporting shoulder 5 upon which said cartridge rests. When positioned in the container 4, the cartridge 3 is spaced from the top and bottom of said container.

The body 1 has embedded therein a support which is designated generally by the reference numeral 6. The support 6 comprises a plurality of wires having their intermediate portions twisted together in a manner to provide a centrally located vertical stem or shank 7. The lower end portions of the wires constituting the support 6 extend outwardly and downwardly in a manner to provide diverging legs 8 which terminate, at their lower ends, in substantially laterally turned hooks 9. This is illustrated to advantage in Figure 3 of the drawing.

Figure 3:
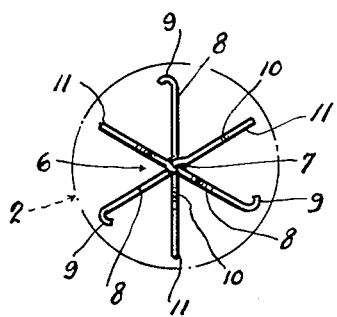
Figure 3 is a plan view of the cartridge.

From the top of the stem or shank portion 7, the wires constituting the support 6 are bent outwardly and downwardly in a manner to provide arms 10. The arms 10 terminate in angularly extending free end portions 11. As best seen in Figure 3 of the drawing, the arms 10 and the legs 8 are staggered relative to each other. The reference numeral 12 designates a screen which is provided beneath the body of waste material 1. Mounted on top of the cartridge 3 is a substantially cup shaped perforated cap 13 of suitable metal.

It will thus be seen that a support has been provided which will prevent compressing of the filtering body 1 by the oil as it is forced through said body under pressure while at the same time permitting free passage of said oil. While a support comprising three wires has been shown, any suitable number of wires may be used.

It is believed that the many advantages of a filter cartridge constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A filter cartridge comprising a body of compressible filtering material, and a support embedded in the body for preventing compressing thereof, said support including a plurality of wires having their intermediate portions twisted together and terminating in substantially outwardly projecting free end portions.

2. A filter cartridge comprising a body of compressible filtering material, and a support embedded in the body for preventing compressing thereof, said support including a plurality of wires twisted together and terminating, at one end, in substantially diverging legs, said legs terminating in hooks at their free ends.

3. A filter cartridge comprising a body of compressible filtering material, and a support embedded in the body for preventing compressing thereof, said support including a plurality of wires twisted together and terminating, at one end, in substantially diverging legs, said legs terminating in hooks at their free ends, said wires terminating at their other ends in substantially outwardly projecting arms.

WILLIAM GORDON BURHANS.